(12) United States Patent
Conzone et al.

(10) Patent No.: US 6,882,782 B2
(45) Date of Patent: Apr. 19, 2005

(54) PHOTONIC DEVICES FOR OPTICAL AND OPTOELECTRONIC INFORMATION PROCESSING

(75) Inventors: Samuel D. Conzone, Clarks Summit, PA (US); Joseph S. Hayden, Clarks Summit, PA (US); Alexander J. Marker, III, Moscow, PA (US); Marren Walther, Engelstadt (DE); Rainer Liebald, Nauheim (DE); Ulrike Beer, Neu-uern (DE); Ulrich Peuschert, Bodenheim (DE); Ruediger Sprengard, Mainz (DE); Tobias Käleer, Mainz (DE)

(73) Assignee: Schott Glas, Mainz (DE)

( * ) Notice: Subject to any disclaimer, the term of this patent is extended or adjusted under 35 U.S.C. 154(b) by 0 days.

(21) Appl. No.: 09/855,741

(22) Filed: May 16, 2001

(65) Prior Publication Data

US 2002/0089711 A1 Jul. 11, 2002

Related U.S. Application Data

(63) Continuation-in-part of application No. PCT/US00/41720, filed on Nov. 1, 2000.

(51) Int. Cl.$^7$ ................................................. G02B 6/26
(52) U.S. Cl. .............................. 385/49; 385/50; 385/51; 385/58; 385/88; 428/426
(58) Field of Search .................................. 428/426, 220; 385/49, 50, 52, 55, 58, 59, 88, 89, 37, 24

(56) References Cited

U.S. PATENT DOCUMENTS

| 2,538,867 A | 1/1951 | Greger |
| 3,007,832 A | 11/1961 | Milne |
| 3,622,440 A | 11/1971 | Snedeker et al. |
| 3,793,105 A | 2/1974 | Birchall et al. |
| 3,880,632 A | 4/1975 | Podvigalkina |

(Continued)

FOREIGN PATENT DOCUMENTS

| EP | 0 492 577 A2 | 7/1992 |
| EP | 0 617 527 | 9/1994 |
| EP | 0 775 674 A2 | 5/1997 |
| EP | 0 858 976 A2 | 8/1998 |
| EP | 0 867 985 A1 | 9/1998 |
| GB | 909 679 | 6/1959 |
| GB | 1 000 796 | 4/1963 |
| GB | 1 060 393 | 8/1963 |
| GB | 2 293 936 | 4/1996 |
| WO | WO 97/43117 | 11/1997 |

OTHER PUBLICATIONS

Joining Ceramics, Glass and Metal, Brockman, University of Kalserslautern, Germany, Brockmann, May 17–19, 1993.
Spectroscopic Properties of $Nd^{3+}$ Dopant Ions in Phosphate Laser Glass, Payne et al., Ceramic Transactions, vol. 28, 1992.

(Continued)

*Primary Examiner*—Drew A. Dunn
*Assistant Examiner*—Fayez Assaf
(74) *Attorney, Agent, or Firm*—Millen, White, Zelano, Branigan, P.C.

(57) ABSTRACT

The invention concerns a photonic device comprising a first section including a material adapted to interact with photons, a second section including a material adapted to interact with photons, with an area of said first section and an area of said second section abutting each other wherein at least a part of said first area and a part of said second area defines a low temperature bonding area to provide adaptability for a plurality of applications based on a combination of materials having specific characteristic benefits, however without introducing unwanted effects having a negative influence on the quality of optical signals.

58 Claims, 13 Drawing Sheets

U.S. PATENT DOCUMENTS

Figure 1:
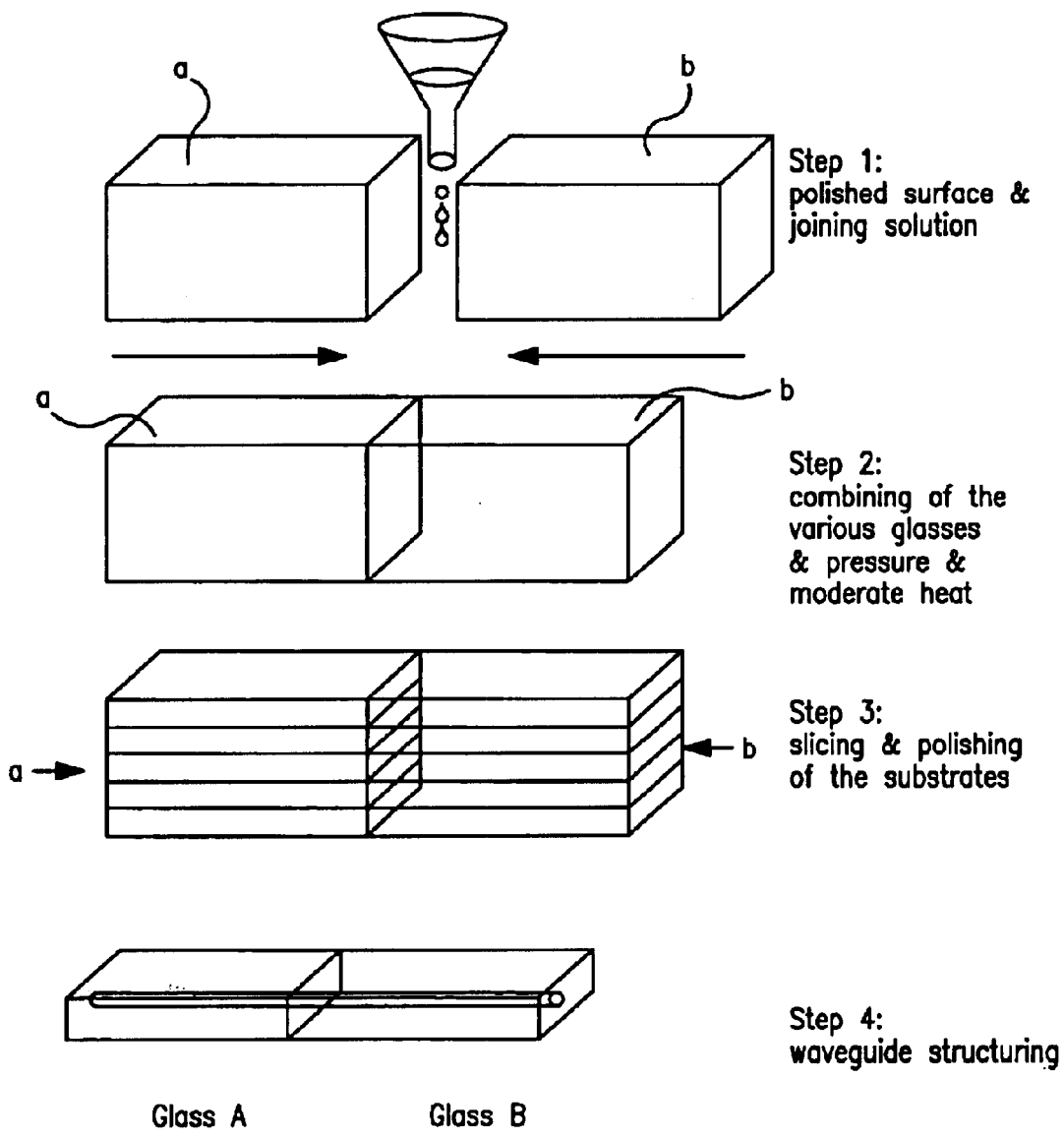

| | | |
|---|---|---|
| 3,997,700 A | 12/1976 | Jacquemin et al. |
| 4,005,172 A | 1/1977 | Birchall et al. |
| 4,052,524 A | 10/1977 | Harakas et al. |
| 4,075,120 A | 2/1978 | Myers et al. |
| 4,108,673 A | 8/1978 | Toratani et al. |
| 4,229,220 A | 10/1980 | Hirota |
| 4,239,645 A | 12/1980 | Izumitani et al. |
| 4,248,732 A | 2/1981 | Myers et al. |
| 4,406,681 A | 9/1983 | Rapp |
| 4,451,312 A | 5/1984 | Nolte |
| 4,661,284 A | 4/1987 | Cook et al. |
| 4,767,725 A | 8/1988 | Mizutani et al. |
| 4,770,811 A | 9/1988 | Myers |
| 4,820,662 A | 4/1989 | Izumitani et al. |
| 4,879,041 A | 11/1989 | Kurokawa et al. |
| 4,883,215 A | 11/1989 | Goesele et al. |
| 4,908,339 A | 3/1990 | Blount |
| 4,929,387 A | 5/1990 | Hayden et al. |
| 5,008,003 A | 4/1991 | Sakai et al. |
| 5,032,315 A | 7/1991 | Hayden et al. |
| 5,039,631 A | 8/1991 | Krashkevich et al. |
| 5,238,518 A | 8/1993 | Okubi et al. |
| 5,246,890 A | 9/1993 | Aitken et al. |
| 5,264,285 A | 11/1993 | Dougherty |
| 5,281,560 A | 1/1994 | Francis et al. |
| 5,334,559 A | 8/1994 | Hayden |
| 5,346,865 A | 9/1994 | Aitken et al. |
| 5,378,502 A | 1/1995 | Willard et al. |
| 5,403,451 A | 4/1995 | Riviello et al. |
| 5,413,620 A | 5/1995 | Henry |
| 5,478,527 A | 12/1995 | Gustafson et al. |
| 5,491,708 A | 2/1996 | Malone et al. |
| 5,503,704 A | 4/1996 | Bower et al. |
| 5,508,235 A | 4/1996 | Marker |
| 5,526,369 A | 6/1996 | Hayden et al. |
| 5,532,857 A | 7/1996 | Gertel et al. |
| 5,543,648 A | 8/1996 | Miyawaki |
| 5,578,179 A | 11/1996 | Demorest et al. |
| 5,580,605 A | 12/1996 | Ogawa et al. |
| 5,580,846 A | 12/1996 | Hayashida et al. |
| 5,681,484 A | 10/1997 | Zanzucchi et al. |
| 5,843,767 A | 12/1998 | Beattie |
| 5,846,638 A | 12/1998 | Meissner |
| 5,851,938 A | 12/1998 | Nishii et al. |
| 6,048,811 A | 4/2000 | Morena |
| 6,075,625 A | 6/2000 | Ainslie et al. |
| 6,129,854 A | 10/2000 | Ramsey et al. |
| 6,284,085 B1 | 9/2001 | Gwo |

OTHER PUBLICATIONS

Thermal–Mechanical and Physical–Chemical Properties of Phosphate Laser Glass, Elder et al., Ceramic Transactions, vol. 28, 1992.

Effect of Phosphate Glass Composition on the Rate of Platimun Dissolution, Hayden et al., Ceramics Transactions, vol. 28, 1992.

Ion–Exchange Planar Lossless Splitter At 1.5 βm, Roman et al., Electronic Letters, vol. 32, No. 4, 1996.

Phosphorus–An Outline of its Chemistry, Biochemistry and Technology, Corbridge, Studies in Inorganic Chemistry 6, Jan. 1985.

Laser Arrays May Provide DWDM Measurement Tool, Veasey et al., Laser Focus World, May 1999.

The Chemistry of Phosphorus, Toy, pp. 440–485, Pergamon Press 1973.

Glass–Ceramic Formation in the $ZnO-P_2O_5$ System and the Effect of Silica as a Nucleating Agent, Jordey et al., J. Am. Ceram. Soc. 82 [8] 2239–45 (1999).

Introduction To Glass Science and Technology, Shelby, Royal Science of Chemistry Paperbacks, 1997.

Multiwavelength Optical Networks, A Layered Approach, Stern et al., 1999.

Optical Fiber Telecommunications II, Millet et al., Academic Press, Inc. 1988.

Glass–Science and Technology, Uhlmann et al., Academic Press, vol. 1, 1983.

Fundamentals of Photonics, Saleh et al., John Wiley & Sons, Inc., 1991.

Applied Physics Letters, Veasey et al., American Institute of Physics, vol. 74, No. 6, Feb. 8, 1999.

Phosphorus and its Compunds, Coulson, Valence, Oxford University Press, Oxford, p. 210, 1952.

Seka et al., "High–powe phosphate–glass laser system: design and performance characteristics," 2219 Applied Optics, vol. 19 (Feb. 1, 1980), No. 3 pp. 409–419.

Taccheo et al., "Widely tunable single–frequency erbium–ytterbium phosphate glass laser," Appl. Phys. Lett. 68 (19), May 6, 1996, pp. 2621–2623.

Goldberg et al., "Repetitively pulsed mode–locked Nd:phosphate glass laser oscillator–amplifier system," Applied Optics, vol. 21, No. 8, Apr. 15, 1982, pp. 1474–1477.

U.S. patent Appl. No. 09/597,157, filed Jun. 20, 2000.

U.S. patent Appl. No. 10/048,946, filed Feb. 6, 2002.

Yasuyuki Inoue, Athermal silica–based arrayed–waveguide grating (AWG) multiplexer, NTT Opto–electronics Laboratoreis, ECOC 97, Sep. 1997 pp. 22–25 (Conference Publication No. 448).

Patent Abstracts of Japan, vol. 1998, No. 5, Apr. 30, 1998 & JP 10 020352 (Toyo Commun. Equipment Co., Ltd.) Jan. 23, 1998.

Patent Abstracts of Japan, vol. 1996, No. 6, Jun. 23, 1996 & JP 08 0361995 (Nippon Telegram & Telephone Corp.) Feb. 6, 1996.

Patent Abstracts of Japan, vol. 1996, No. 4, Apr. 30, 1996 & JP 07 318986 (NEC Corp.), Dec. 8, 1995.

PHOTONIC DEVICES FOR OPTICAL AND OPTOELECTRONIC INFORMATION PROCESSING

SPECIFICATION

This application is a continuation-in-part of International application PCT/US00/41720, filed Nov. 1, 2000, which is incorporated by reference in its entirety, herein.

FIELD OF THE INVENTION

The present invention relates to photonic devices in general and especially to photonic devices as used in optical and optoelectronic information processing and as used for transmitting and storing of optical signals.

PRIOR ART

With increased information densities and ever increasing transmission rates of information carrying signals optical and optoelectronic devices, i.e. devices interacting with photons became of severe interest. However, in many cases for different applications different materials had and have to be employed. Often it is difficult to connect these different materials without introducing reflection, absorption or without generating centers of stray light. Not only losses are due to these detrimental effects but also a reduction of the bit error rate or a reduced signal to noise ratio of the information carrying optical signals. More than this, if stray light is feed back into an amplifying system it may happen that based on the amplification characteristics of this system deleterious intensities of interfering noise signals are generated often decreasing also amplification characteristics for other signals.

SUMMARY OF THE INVENTION

It is an object of the present invention to ameliorate the above-described problems and to provide photonic devices which are adapted to a plurality of applications based on preferred combinations of materials having characteristic benefits without introducing unwanted cross-talk or other effects having a negative influence on the quality of optical signals.

This object is obtained in a surprisingly simple manner with a photonic device comprising a first section including a material adapted to interact with photons, a second section including a material adapted to interact with photons, with an area of said first section and an area of said second section abutting each other and wherein at least a part of said first area and a part of said second area defines a low temperature bonding area.

A low temperature bonding area is defined according to the present invention as an area where a surface area of at least a first material or article is connected or bonded to a surface area of a second material or article by means of a low temperature bonding process or method, such processes and methods being defined in more detail in United States patent application "Low Temperature Joining of Phosphate Glass" filed on Nov. 1, 1999, Ser. No. 09/430,885, which document is incorporated here by reference. Joining of further materials, i.e. joining and bonding of materials as oxide glasses, $SiO_2$ glasses, especially doped $SiO_2$ glasses, multi coated glasses, fluoride glasses, chalcogenide glasses, joining of crystals, especially $LiNbO_3$ crystals, semiconductors, especially semiconductors as GaAs, InP, GaAsP, GaAlAs, Si and joining of mixed combinations of the above-mentioned materials is described in more detail in "Low Temperature Joining of Phosphate Glass" filed in the United States Patent and Trademark Office on Nov. 1, 2000 (PCT/US00/41721), and being a continuation in part application of above-cited US application "Low Temperature Joining of Phosphate Glass" filed on Nov. 1, 1999, Ser. No. 09/430,885 which continuation in part application also is incorporated herein by reference.

Connecting two waveguiding materials by conventional techniques has been time consuming and therefore expensive. According to a common prior art processing method in a first step the two devices to be connected had to undergo a waveguide structuring process. Solely in a second step, the two devices had been connected. Thus, alignment of the two waveguiding structures had to be carried out up to now with a very high accuracy. Moreover, a further drawback of the conventional technique is that each device had to be joined separately.

The low temperature bonding process as used here, however, allows for a cost effective mass production: the substrates are joined in large blocks and separated later into individual slices. The waveguides are implemented thereafter in the already joined substrates. Therefore, alignment of the waveguides is not necessary in a photonic device according to the invention.

A still further advantage of the inventive low temperature bonding process is an improved reliability and lifetime of the bonded devices as compared to e.g. epoxy bonds.

In the description of the present invention the terms photon and light are used essentially for the same physical underlying effects of generation, transportation and absorption of electromagnetic energy, however, a more photonic character is encountered in general and then the term photon used if very small intensities are discussed or when absorption or generation or emission effects take place, whereas light seems to be a more appropriate expression for huge amounts of photons where intensity fluctuations are of a minor concern or if interference, diffraction and refraction are predominating effects.

Based on the above-cited joining processes and methods said low temperature bonding area connects said first area and said second area mechanically and optically with very little losses and essentially no centers for stray light or reflections are introduced into the propagation path of photons crossing this low temperature bonding area.

According to the broad gist of the invention, said interaction with photons comprises one ore more interaction types of the group of interactions consisting of transmission of photons, reflection of photons, guiding of photons, absorption of photons, generation of photons, emission of photons, diffraction of photons, refraction of photons, superimposing photons and generation of photon interference.

Based on the broad applicability of the said low temperature bonding processes and methods many different materials may be bonded together to obtain optimum characteristics for different applications. Consequently, for many applications said first material has at least a portion where an index of refraction is different from an index of refraction of at least a portion of said second material.

If said photonic device comprises a wave guide defined in a surface area of said first material and said waveguide is covered by said second material then an essentially unrestricted plurality of two-dimensional wave guide structures can be obtained according to the invention and different optical devices can be interconnected by means of such a structure. Consequently, an essentially two-dimensional optical chip is defined where it is suitable to rely on two-dimensional wave guide structures for connecting active and/or passive optical components.

Based on a process described in more detail in "Three-dimensional microscopic modifications in glasses by a femtosecond laser", SPIE Conference on Laser Applications in Microelectronic and Optoelectronic Manufacturing IV, San Jose, Calif., January 1999, SPIE Vol. 3618, p. 307 to 317, which publication completely is incorporated herein by reference, waveguides are defined in areas of the bulk material adapted to connect two-dimensional waveguide structures as mentioned above. Significantly, thus an essentially three-dimensional optical chip is defined with waveguides connecting active and/or passive optical components.

Moreover, if a two-dimensional waveguide structure is connected at its surface to active and passive optical elements, then a surface mounted optical circuit is realized and mounting and assembling techniques as known from electronic and semiconductor industries are applicable to a great extend.

In a preferred embodiment, said photonic device is a transmitter and said first section comprises a light source and said second section comprises a splitter for splitting a propagation path of photons emitted by the light source into a plurality of propagation paths. Advantageously, a modulator is connected to the splitter for modulating a phase of the photons transmitted through the modulator, thus an amplitude or intensity modulation and an additional modulation of the optical phase of the signal is obtainable.

In a further preferred embodiment, said photonic device is an amplifier and said first section comprises a wavelength dependent splitter splitting different wavelengths into different propagation paths and said second section comprises an amplifying material at least for one of the wavelengths associated with one of the propagation paths of the wavelength dependent splitter.

An ultra broadband amplifier is provided having a extreme broad spectral gain if said wavelength dependent splitter splits light into a plurality of different wavelengths and each of the different wavelengths is associated with a different propagation path and said second section comprises a plurality of portions comprising an amplifying material associated with at least one of the wavelengths. Preferably, each of the portions comprising amplifying material is containing a dopant being a rare earth element adapted in its amplifying characteristics to said associated wavelength for amplifying light of said associated wavelength.

In a still further preferred embodiment said splitter is an arrayed waveguide grating (AWG) and splits light into transmission bands essentially centered at 1.3 $\mu$m, 1.4 $\mu$m and 1.5 $\mu$m, said 1.3 $\mu$m transmission band being associated with a Praseodym doped Chalcogenide glass and said associated diode laser light source having a pump light wavelenghts centered at about 1020 nm, said 1.4 $\mu$m transmission band being associated with a Tm doped Fluoride glass and said associated diode laser light source having a pump light wavelenghts centered at about 800 nm and said 1.5 $\mu$m transmission band being associated with an Erbium doped Phosphate glass and said associated diode laser light source having a pump light wavelenghts centered at about 980 nm.

In a further alternate preferred embodiment said photonic device is an amplifier having a plurality of amplification portions comprising amplifying material and arranged serially in a direction of the propagation of light and wherein said first section comprises a first amplification portion and said second section comprises a second amplification portion. Significantly, also in this embodiment said plurality of amplification portions define and overall spectral gain which has an increased gain over an extended wavelength interval with a improved gain flatness in comparison to one of the said amplification portions.

In a still further preferred embodiment, said photonic device is a receiver and said first section comprises a photo detector and said second section comprises at least a waveguide for guiding photons to the photo detector.

If said second section comprises a light amplifying material for amplification of photons propagating in said waveguide also low intensity signals are detectable with a high signal to noise ratio. Advantageously, said amplifying material comprises a rare earth dopant which is optically pumped by a light source.

In a still further preferred embodiment said photonic device is an optical add/drop multiplexer and said first section comprises a demultiplexer for demultiplexing light into a plurality of propagation paths and said second section comprises optical switching means for switching between light from the multiplexer and added light, said second section is connected to a multiplexer section for multiplexing light from a plurality of propagation paths to a single propagation path.

Advantageously, said switching means comprise Mach Zehnder type interferometers for essentially absorption free switching of the propagation direction of photons based on an alteration of the optical path length in at least one of the arms of the Mach Zehnder interferometer.

Very durable and reliable photonic devices are provided if said alteration of the optical path length of said at least one arm of the Mach Zehnder interferometer is introduced thermooptically. High speed applications introduce said alteration of the optical path length of said at least one arm of the Mach Zehnder interferometer electrooptically.

Moreover, switching means like mirrors switching optical paths within micro electromechanical systems (MEMs) or within micro magnetical systems advantageously could be connected to input/output optical waveguides as f.i. planar optical waveguides or linear or two-dimensional arrays of optical fibers.

If in a still further preferred embodiment said photonic device has at least a first waveguide in said first section comprising a material having an index of refraction n1 with a positive temperature coefficient $\partial n1/\partial T$ and with at least second waveguide in said second section comprising a material having an index of refraction n2 with a negative temperature coefficient $\partial n2/\partial T$ said first and said second waveguides being optically connected to each other a predefined temperature dependence of the overall or effective index of refraction is obtainable. In a most preferred embodiment a temperature coefficient of an overall or effective index of refraction encountered by a photon propagating through the first and second waveguide is essentially temperature independent.

In a still further preferred embodiment said photonic device is a multiplexer/demultiplexer comprising a plurality of first waveguides, a plurality of second waveguides and a plurality of third waveguides and has an essentially temperature independent index of refraction.

Further preferred embodiments are comprising one ore more elements of the group consisting of filter based wavelength divisional multiplexers WDM, dense wavelength divisional multiplexers, variable optical attenuators, filter modules for dispersion compensation, gain flattening filters, lenses, collimators and micro optical arrays.

Figure 2:
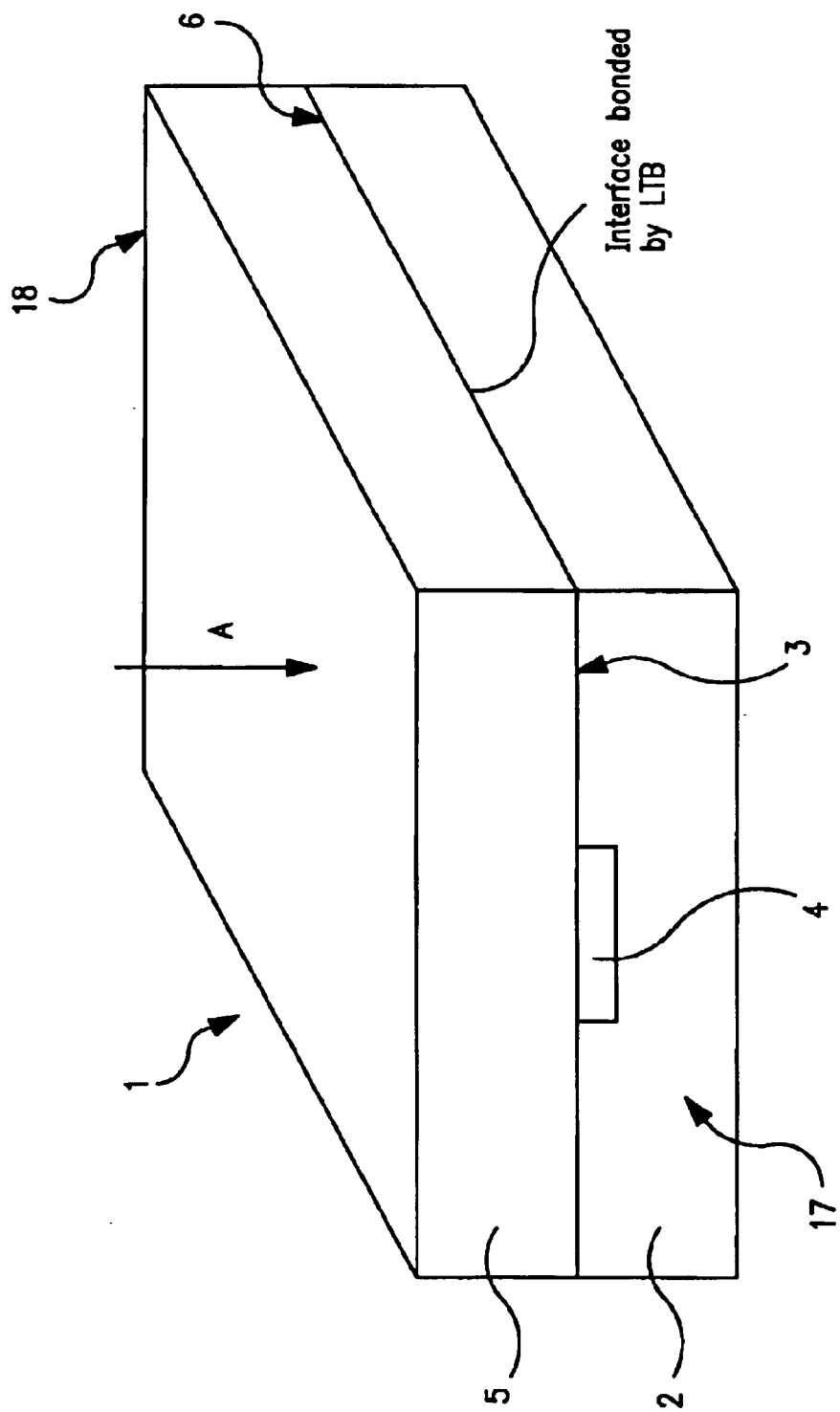
Figure 3:
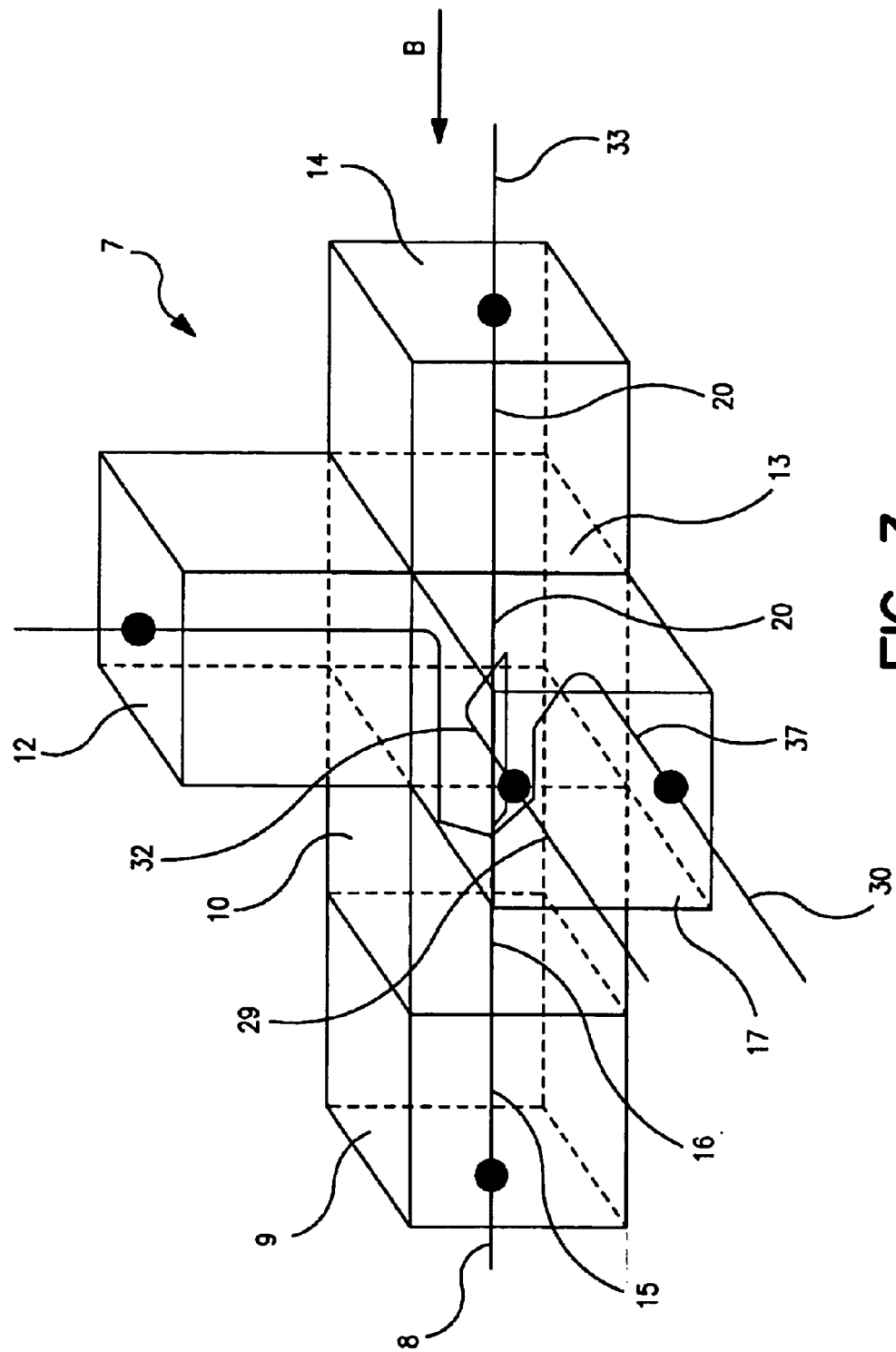
Figure 4:
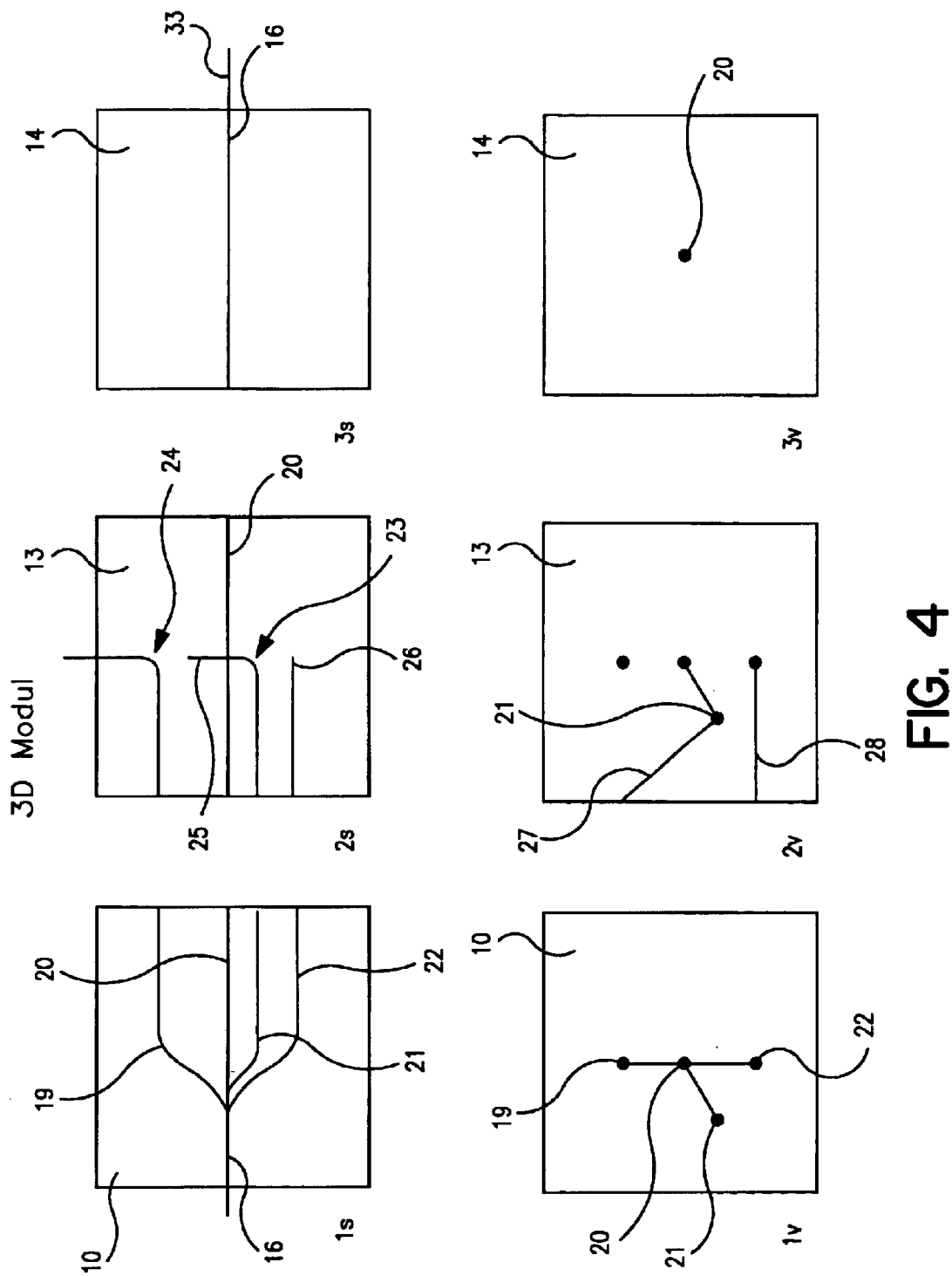
Figure 5:
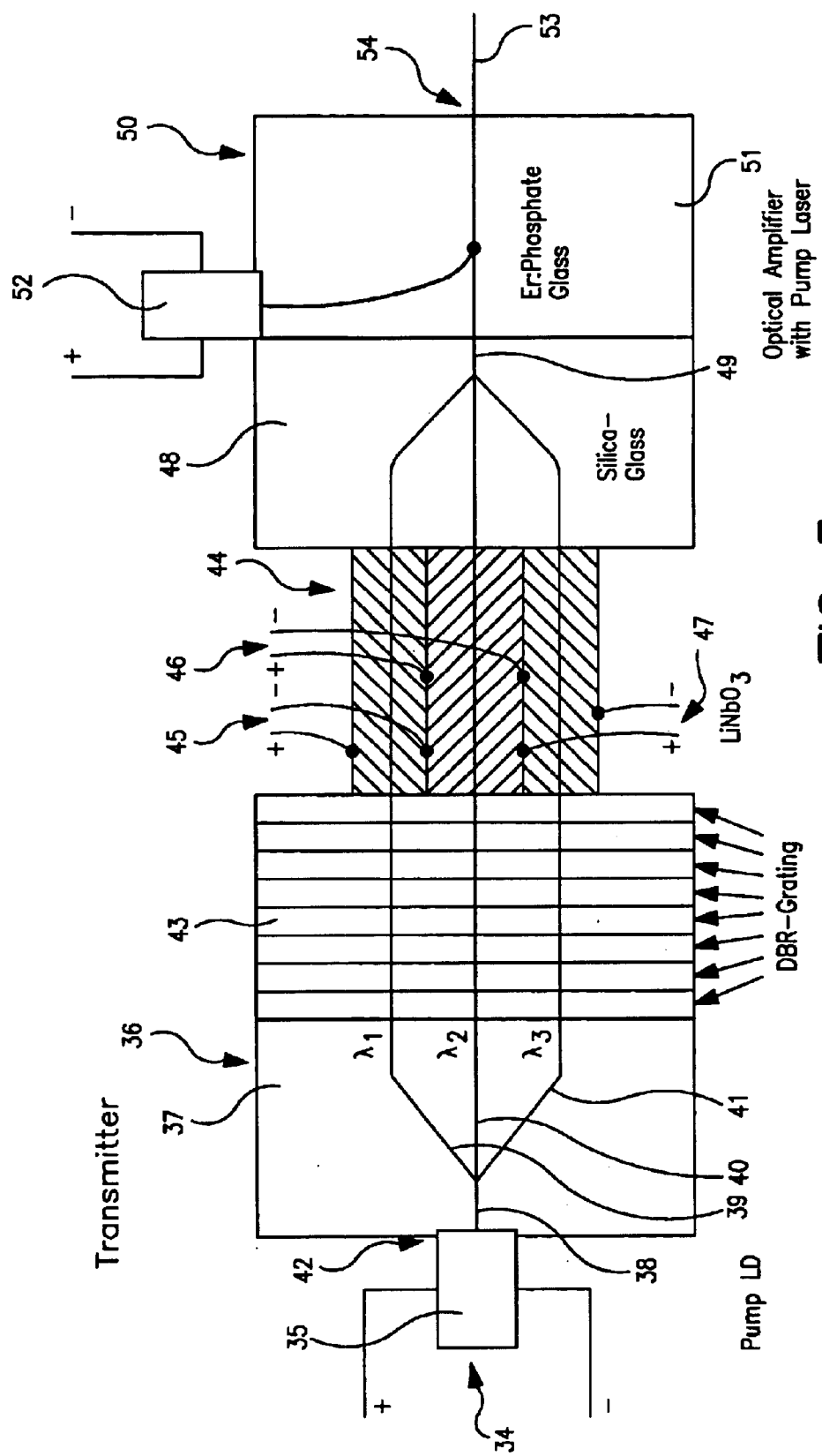
Figure 6:
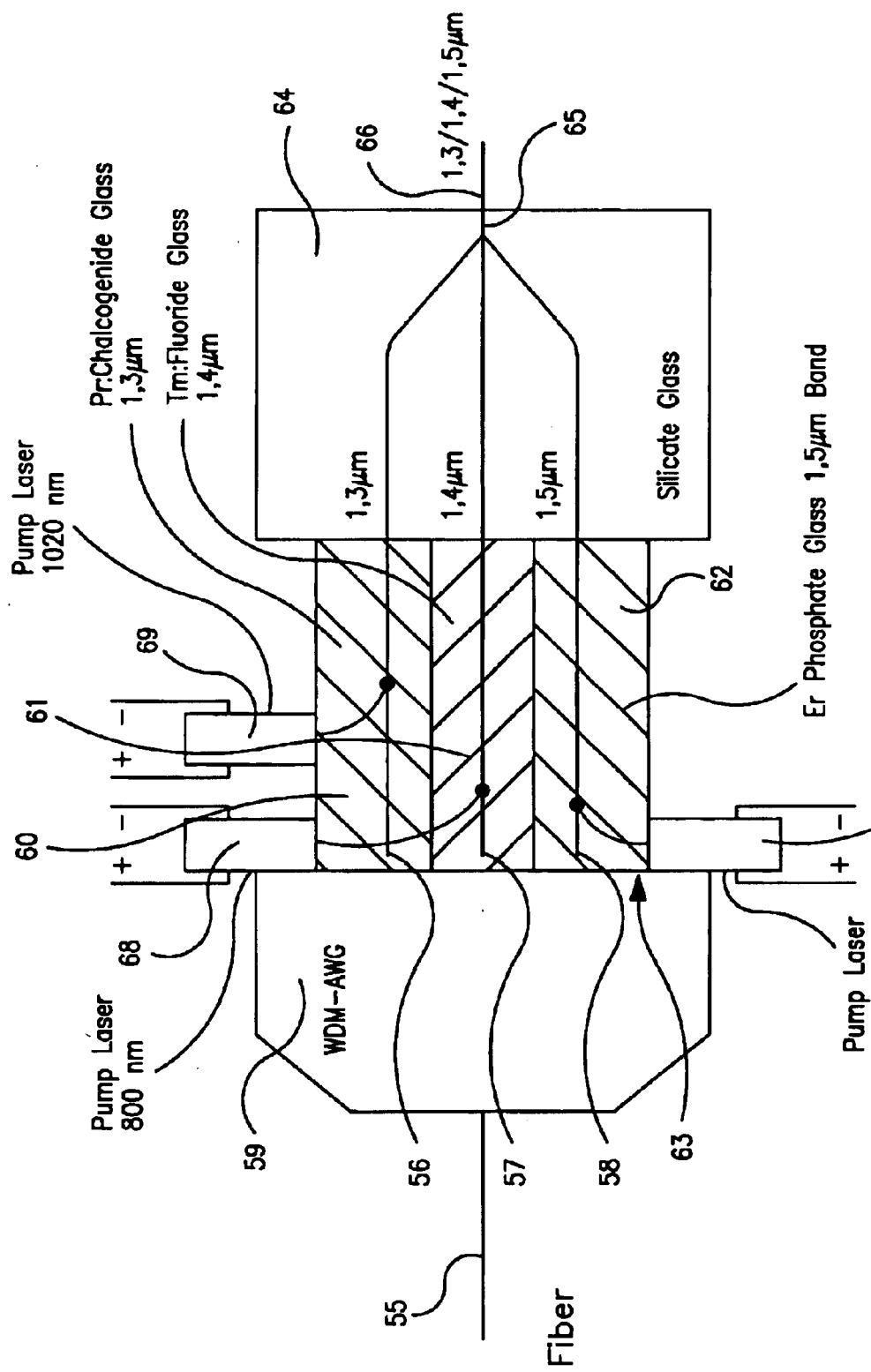
Figure 7:
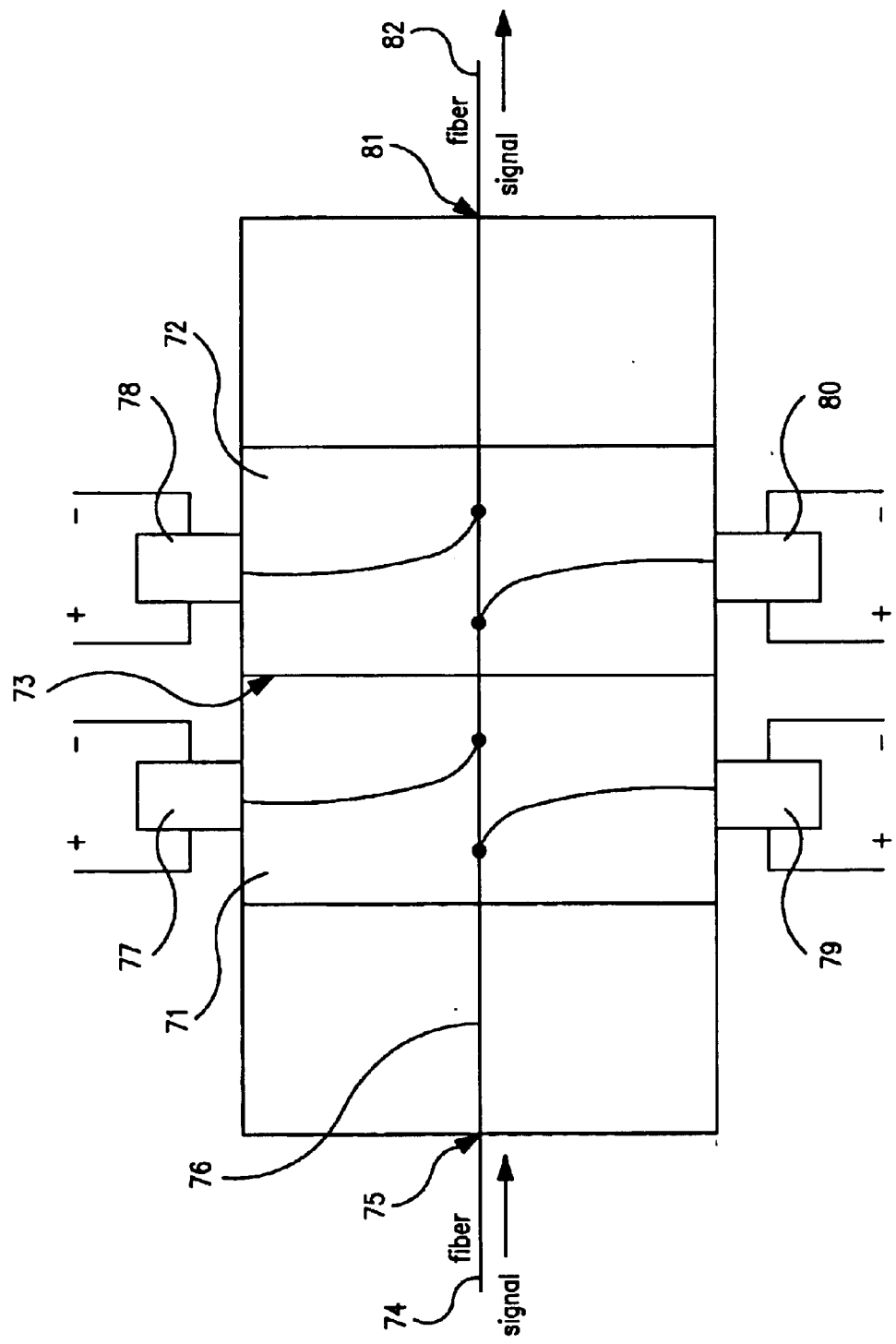
Figure 8:
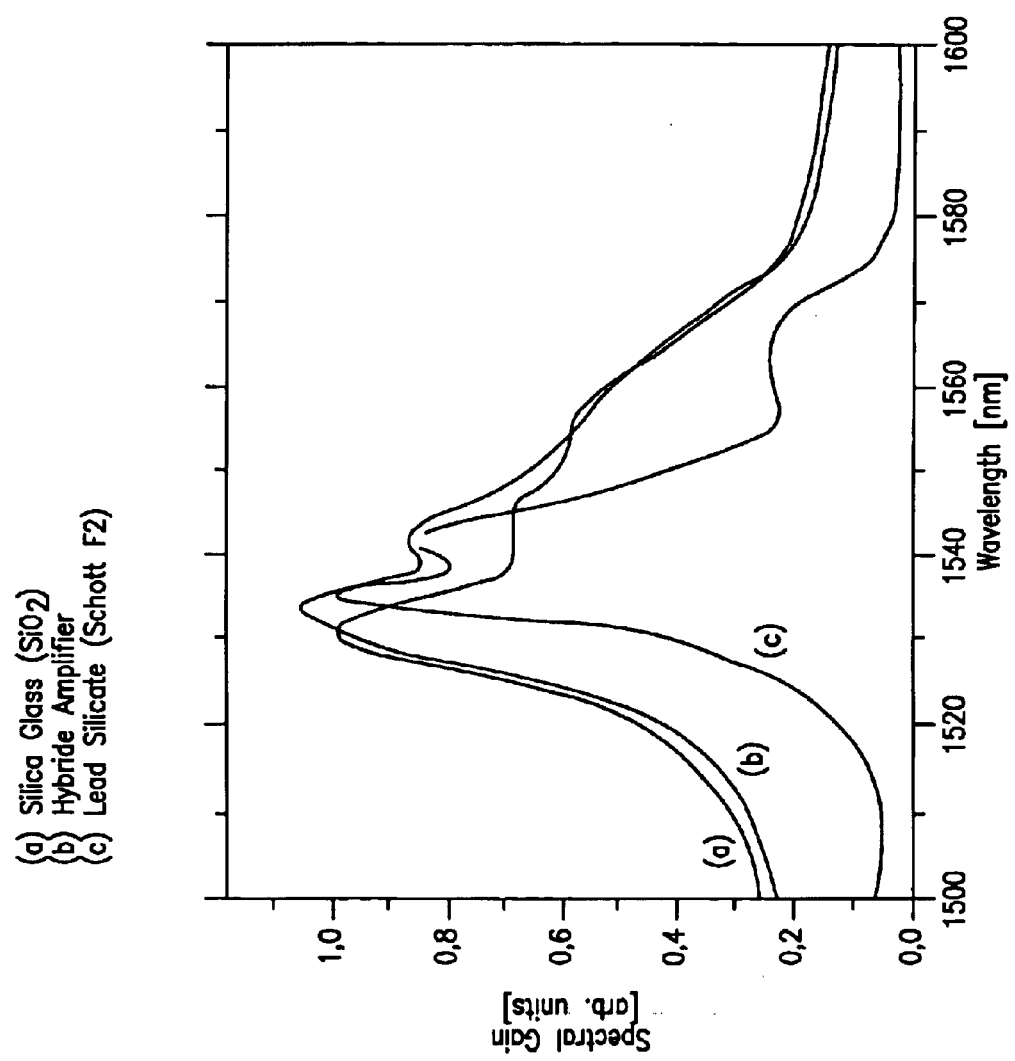
Figure 9:
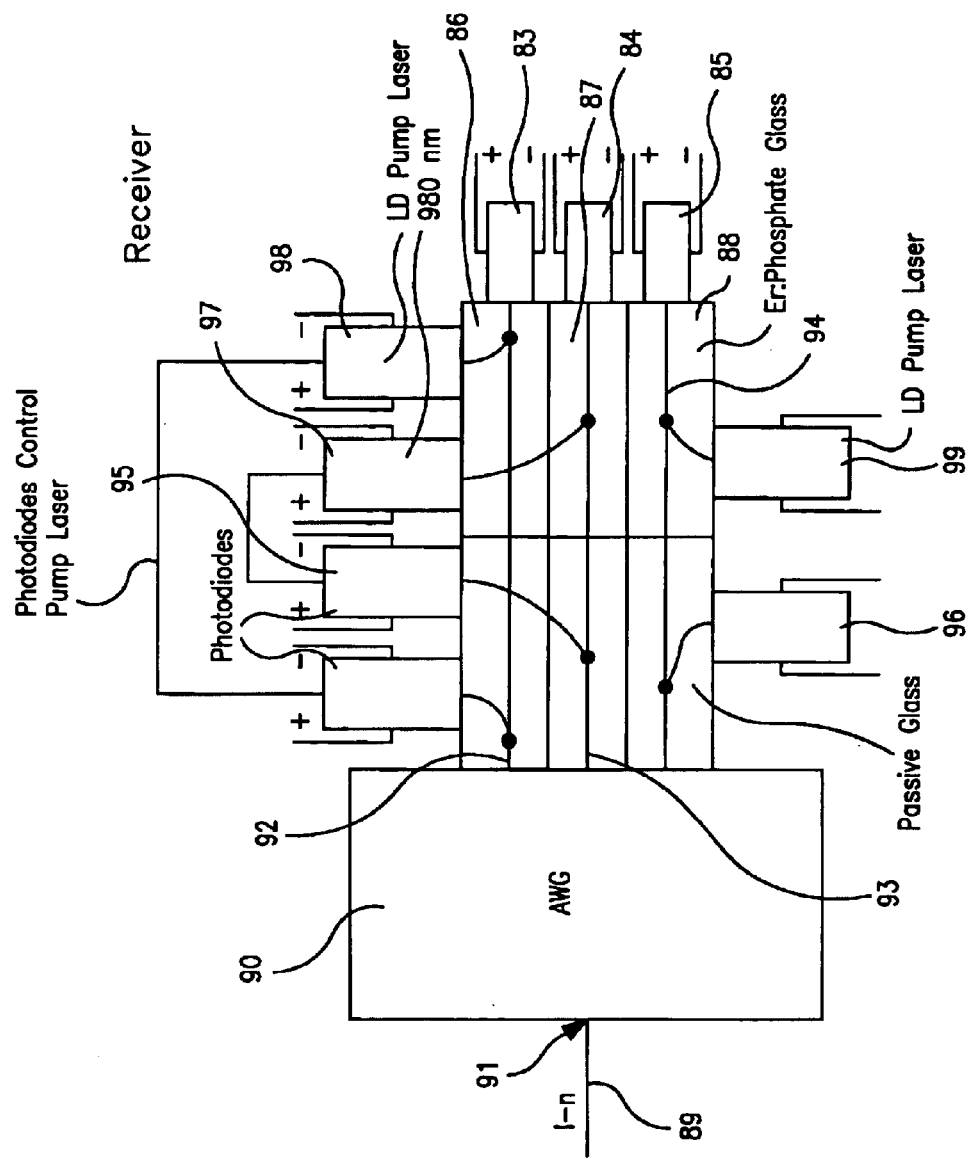
Figure 10:
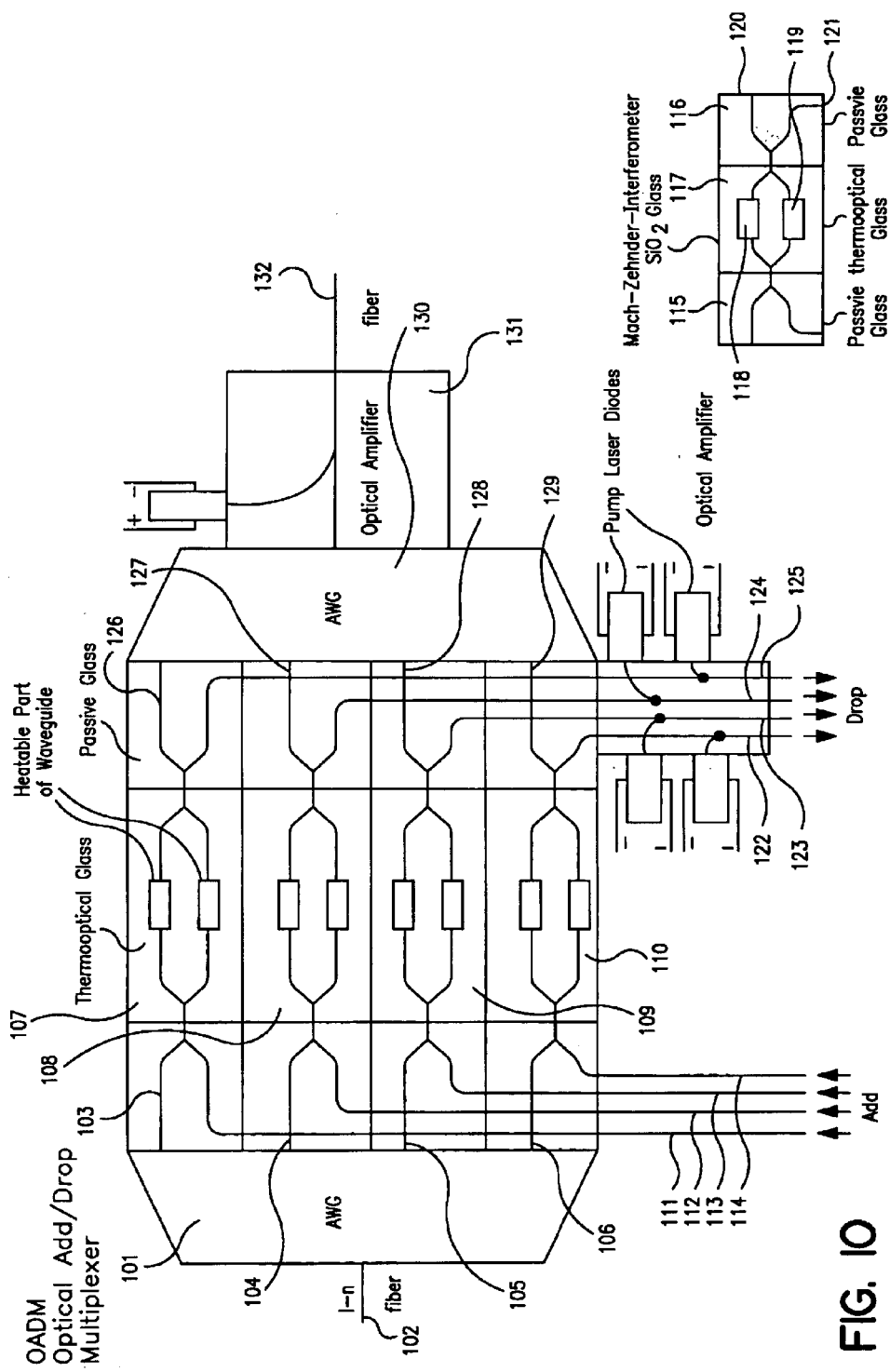
Figure 11:
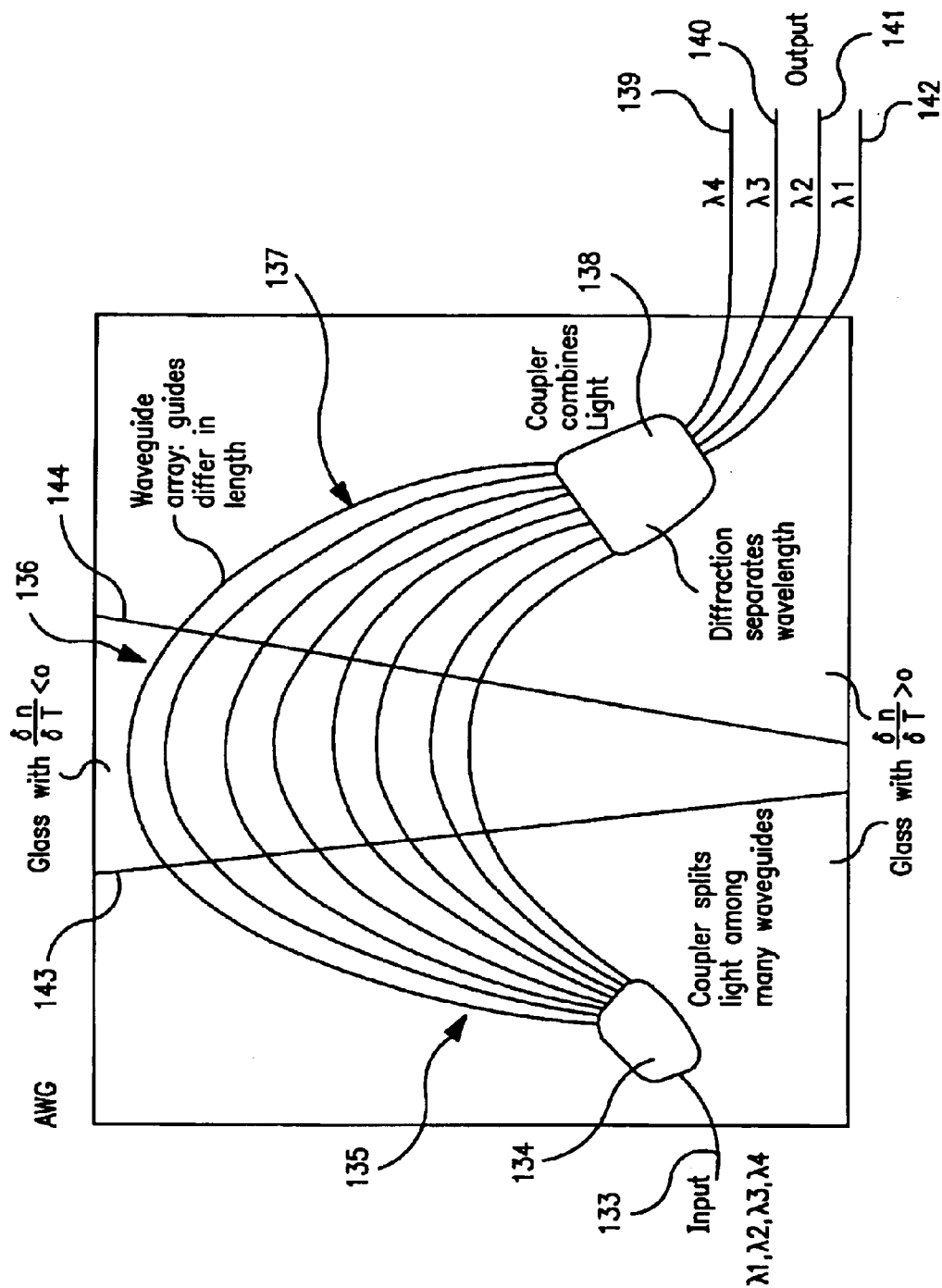
Figure 12A:
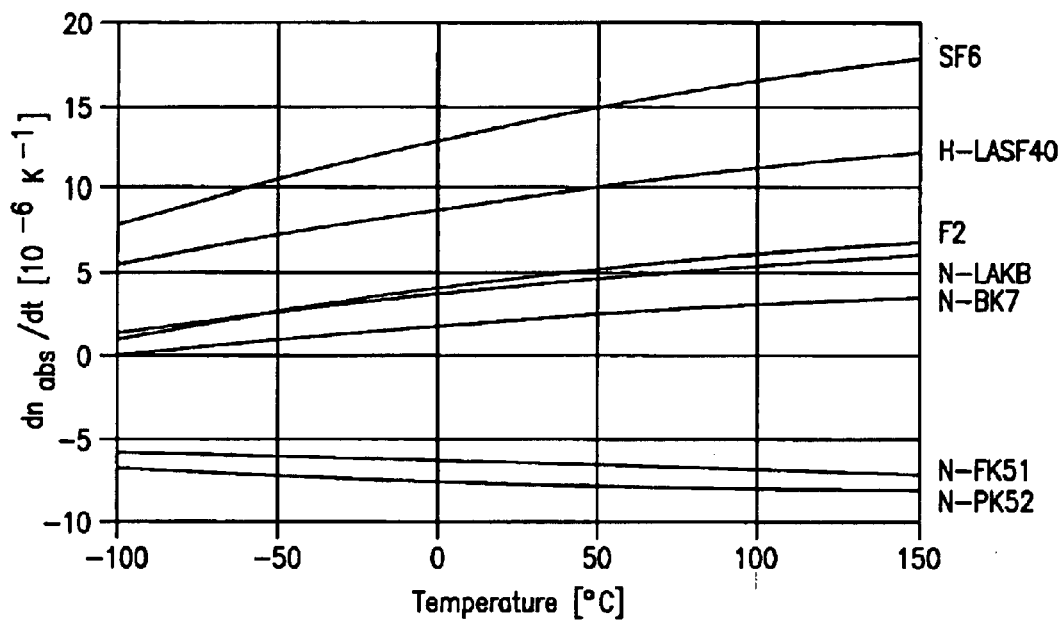
Figure 12B:
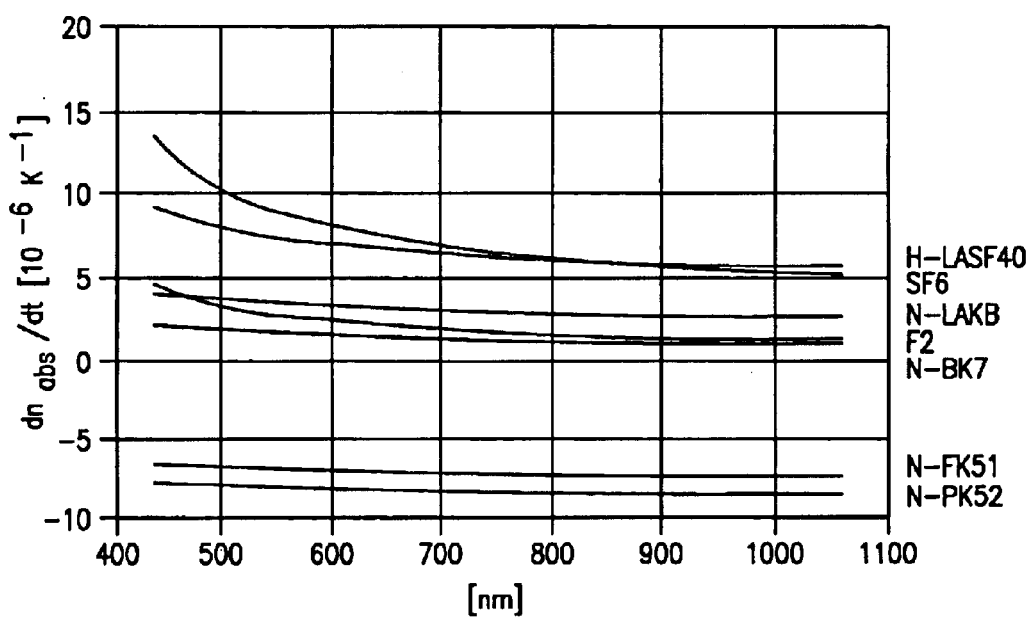
Figure 13A:
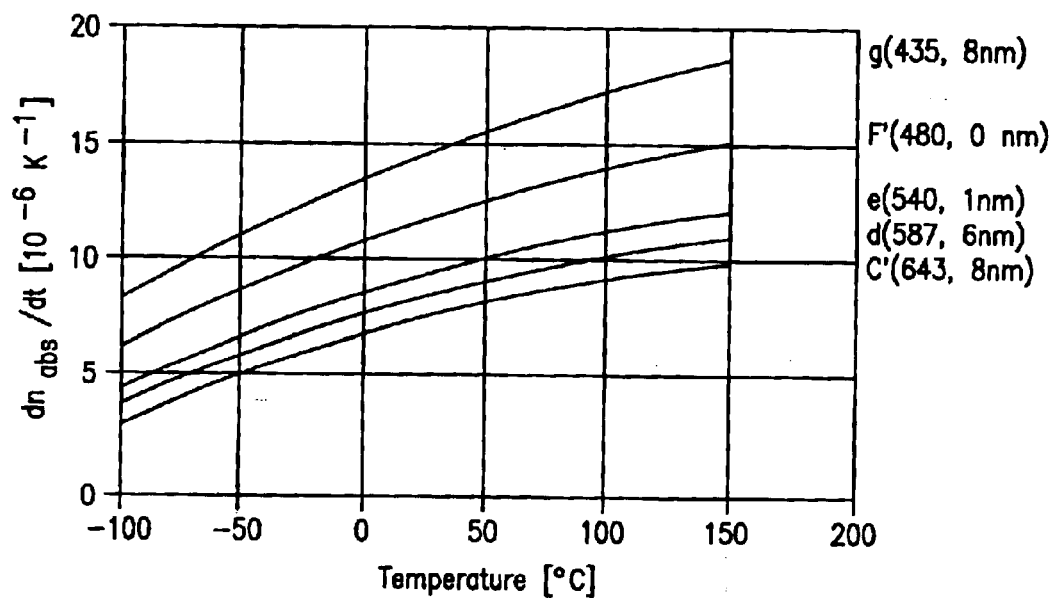
Figure 13B:
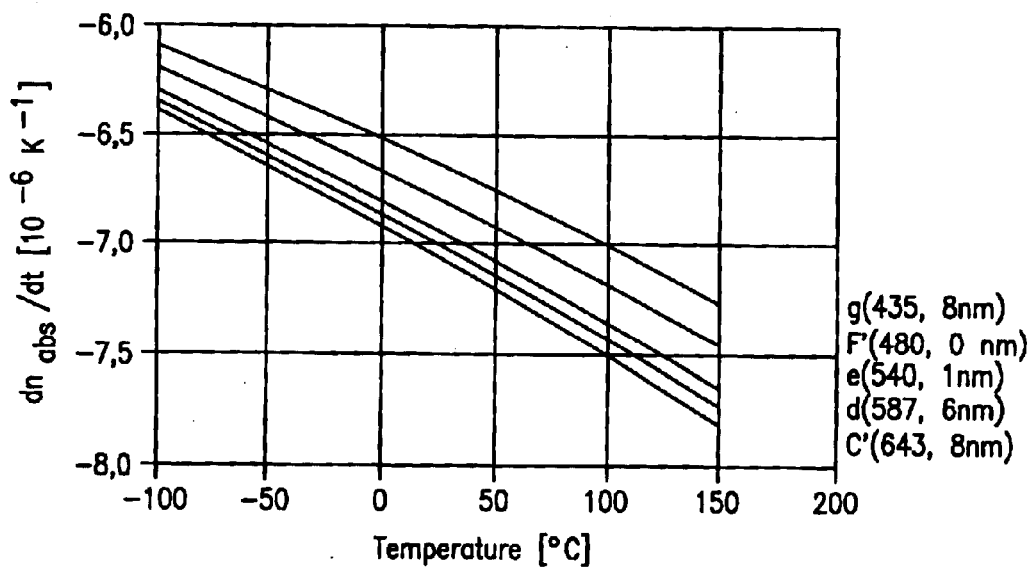

The invention is described in more detail and based on preferred embodiments below and reference is made to the accompanying drawings in which:

FIG. 1 shows a preferred process scheme for a low temperature bonding process for preparation and production of the inventive photonic devices, FIG. 2 shows a first embodiment of a photonic device being a two-dimensional waveguide structure, FIG. 3 shows a second embodiment of a photonic device being a three-dimensional waveguide structure, FIG. 4 shows different cross sections of a three-dimensional waveguide structure as indicated in FIG. 3, FIG. 5 shows a third embodiment of a photonic device being a transmitter including a laser diode pumped glass based multiwavelength light source, a modulator and an optical amplifier, FIG. 6 shows a fourth embodiment of a photonic device being an ultra broadband amplifier, FIG. 7 shows a fifth embodiment of a photonic device being a hybrid gain flattened broadband amplifier, FIG. 8 shows spectral gain characteristics for a hybrid gain flattened amplifier as depicted in FIG. 6, FIG. 9 shows a sixth embodiment of a photonic device being a receiver cascaded with adjustable single channel optical amplifiers, FIG. 10 shows a seventh embodiment of a photonic device being an optical add/drop multiplexer, FIG. 11 shows an eighths embodiment of a photonic device being an arrayed waveguide grating (AWG) having a compensated temperature dependence of the index of refraction, FIG. 12a variations of the temperature coefficient of the absolute index of refraction as a function of the temperature for different glasses at a wavelength of about 435.8 nm FIG. 12b temperature coefficient of the absolute index of refraction as a function of the wavelengths for different glasses at a temperature of 20° C., FIG. 13a variations of the temperature coefficient of the absolute index of refraction as a function of the temperature and of the wavelengths for a specific transparent material, FIG. 13b variations of the temperature coefficient of the absolute index of refraction as a function of the temperature and of the wavelengths for a further specific transparent material.

DETAILED DESCRIPTION OF PREFERRED EMBODIMENTS

For the sake of clarity and for a better understanding of the invention drawings as attached hereto are only a schematic representation of the preferred embodiments and certain characteristics thereof but not drawn to scale.

FIG. 1 illustrates the Low Temperature Bonding process as used f.i. for the production of photonic devices. In a first step, polished surfaces of two different glass blocks a and b are joined together with a specifically adapted solution.

In a second step, the joined blocks a, b are subject to an applied increased pressure and a low temperature bake.

In step three the blocks a, b are sliced into individual substrates.

Step four represents the waveguide implementation. A person skilled in the art will know how to produce waveguides in different host materials, as e.g. by ion diffusion, ion exchange or photo induced refractive index change, ultra violet light UV exposure, femtosecond laser exposure and interference techniques.

Reference is made now to FIG. 2 showing a first embodiment of a photonic device 1 being a two-dimensional waveguide structure and providing a basis for two-dimensional optical circuits as integrated optical two-dimensional structures.

In an optical substrate 2 having an essentially planar upper surface 3, a waveguide 4 is defined as known to a person skilled in the art. Optical substrate 2 consists of an oxide glass, preferably a $SiO_2$ glasses or a doped $SiO_2$ glass. For specific applications optical substrate 2 alternatively consists of or comprises a silicate glass or other oxide glasses, a fluoride glass, a chalcogenide glass or consists of a crystal, especially a $LiNbO_3$ crystal if electrooptic modulation or switching is intended. Optical substrate 2 comprises a semiconductor material, especially semiconductors as GaAs, InP, GaAsP, GaAlAs, Si and combinations thereof if specific transmission and refraction properties or photonic interaction as in light sources and photo detectors are necessary or advantageous for certain applications as explained in more detail in view of preferred embodiments below.

Waveguide 4 is defined in optical substrate 2 by means of well known waveguide formation techniques as ion-diffusion, UV-exposure, or ion diffusion techniques preferably using two-dimensional mask designs.

Optical substrate 2 and waveguide 4 define according to the invention a first section including a material adapted to interact with photons with a light guiding interaction in view of photons propagation along waveguide 4.

Optical substrate 2 is covered by a further material defining a second section 5 with said further material also being adapted to interact with photons. In case of a waveguiding structure said second section 5 of FIG. 1 preferably is a bulk material having about the same index of refraction as the material in section 2 and provides an upper cladding for light guiding purposes at the location of waveguide 4.

However, in general terms interaction with photons includes any interaction of light with material or light with light in a material or electric or magnetic fields or temperature in a material and light propagating or being generated or absorbed in this material. Interaction with photons especially comprises one ore more interaction types of the group of interactions consisting of transmission of photons, reflection of photons, absorption of photons, generation of photons, emission of photons, wavelength conversion of photons, guiding of photons, diffraction of photons, refraction of photons, superimposing photons and generation of photon interference, linear, elliptic and circular polarization of photons.

In the first embodiment of FIG. 2 upper surface 3 of optical substrate 2 and lower surface 6 of upper section 5 are abutting each other and define surface areas in close contact. At least a part of said surface areas being the upper surface of waveguide 4 is in close contact and joined together by a low temperature bonding process and, consequently, defines a low temperature bonding area.

In an alternate embodiment, upper surface 3 of optical substrate 2 or lower surface 6 of second section 5 or both surfaces are coated or structured if necessary or as intended for light guiding purposes.

A coating having high reflection assists in guiding of photons within waveguide 4. An anti reflection coating on lower surface 6 assists photons entering into second section 5, at least entering into a boundary area at the interface defined by surfaces 3 and 6, which photons then are generating an evanescent field adapted to interact with material of second section 5.

A coating also is applicable to increase mechanical strength of the low temperature bond or to introduce additional species into the interface or boundary area, e.g. as laser active substances as rare earth dopants for amplification purposes.

In such an alternate embodiment, said second section is a surface area between a first section of optical substrate 2 and a third section then covering said second section similar as shown by second section 5 of FIG. 2.

If a Bragg grating is generated in surfaces 5 or 6 photons propagating in waveguide 4 are exiting waveguide 4 under a defined angle which angle essentially is defined by a pitch of said Bragg grating.

In addition, light amplification is achieved if a rare earth doped glass is used as especially if a rare earth, such as Er, Yb, Tm, Nd, Pr, doped chalcogenide, fluoride or phosphate glass is used for the material in the first section, i.e. optical substrate 2 or in the second section 5. In the latter case, if pump light having a wavelenghts adapted to a specific dopant is introduced in the direction of arrow A of FIG. 2, then photons propagating in waveguide 4 are having an evanescent field extending into second section 5 and being amplified by said material of second section 5.

The embodiment of FIG. 2 is not restricted to rectangular dimensions as optical substrate 2 and waveguide 4 could define a laterally extended substrate in which two-dimensional optical circuitry is arranged and second section 5 could be a locally restricted amplifier for amplification of light propagating within waveguide 4. Moreover, optical substrate 2 and waveguide 4 could define an optoelectronic hybrid chip whereon waveguide 4 contains laser active material and second section 5 an amplifying means as a pump light source or electronic circuitry for injection of charge carriers into waveguide 4.

Reference is made to FIG. 3 showing a second embodiment of a photonic device being a three-dimensional waveguide structure 7 also termed three-dimensional or 3D module and adapted to be used for a three-dimensional integration of photonic devices.

For a better understanding reference is also made to FIG. 4 where side is, 2s, 3s and front 1v, 2v, 3v views of different cubes of three-dimensional waveguide structure 7 are shown.

As shown in FIG. 3 an optical fiber 8 is—for example by low temperature bonding—connected to a cube 9 which abuts cube 10 at a lateral side surface defining a low temperature bonding area between cubes 9, 10.

1. Instead of a cube 9 also a micro lens or a lens assembly as f.i. a condenser assembly can be connected to optical fiber 8. These micro lenses and condenser assemblies are known to a person skilled in the art and; therefore, not shown in more detail in the drawings. Also a two dimensional array of fibers 9 can be connected to cube 9 or to a two dimensional array of micro lenses or condensers to said two dimensional array of fibers 9.

In an alternate embodiment, cube 9 is a hybrid chip containing optoelectronic elements as laser sources or photodetectors.

Additionally, cubes 11, 12, 13, 14 abut each other at planar surface areas as shown in FIG. 3 and are defining low temperature bonding areas as described above. By means of a method for introducing waveguide structures into bulk material described in more detail in "Three-dimensional microscopic modifications in glasses by a femtosecond laser", SPIE Conference on Laser Applications in Microelectronic and Optoelectronic Manufacturing IV, San Jose, Calif., January 1999, SPIE Vol. 3618, p. 307 to 317, which publication completely is incorporated herein by reference, waveguides 15 and 16 are defined in the bulk material of cubes 9, 10, respectively.

In a further alternate embodiment, cube 9 contains an optically saturable material as f.i. a dopant comprising a saturable dye material an absorption of which is dependent on a photon density or light intensity which is seen by the dopant. Light travelling within waveguide 15 of cube 9 encounters different absorption coefficients dependent on a light intensity as may be introduced in a direction perpendicular to waveguide 15. In this further alternate embodiment, cube 9 defines a variable optical attenuator which provides an element for controlling photons within a first propagation path by photons within a second control propagation path, which second control propagation path could be a free space optical arrangement or an optical imaging system focussing light of the control propagation path onto waveguide 15. Alternatively, a two-dimensional module as shown in FIG. 2 is used and bonds are made at front surfaces 17, 18 where waveguide 4 is freely accessible.

In cube 10 a wave splitter is defined splitting waveguide 16 into four branches 19, 20, 21, 22 as seen from side view is of cube 10 and from front view 1v. Front view 1v is a view in direction of arrow B of FIG. 3 as seen from the interface between cubes 10 and 13.

Branch 21 extends to the left in the direction of cube 11 and in cube 13 a side view of which is depicted in 2s and a front view as seen from interface of cubes 13, 14 is shown in 2v further wave guiding connections are made.

If a sharp bend has to be introduced as indicated f.i. in view 2s then local Bragg gratings are used which could be introduced by two-dimensional structuring of an upper surface of an optical substrate 2 as shown is FIG. 2 which substrate then would be covered by a second section 5 to provide a cube 13. Connections in the bulk material of second section 5 then are introduced as waveguides extending in said bulk material in a direction opposite arrow A of FIG. 2.

Black dots in FIGS. 3 and 4 are defining visible contact areas where light guiding structures are crossing low temperature bonding areas.

Branch 21 of cube 13 is connected to a waveguide 27 which extends further to the left oblique to a left surface of cube 13 and waveguide 28 is connected to branch 22 for providing an optical link to waveguides 31 and 32, respectively.

As shown in FIG. 3 waveguides 31, 32 are connected to optical fibers 29, 30 for further communication purposes.

In cube 14 only waveguide 20 defines a connection to an optical fiber as also seen from side view 3s.

This second embodiment is not restricted to cubical dimensions of modular elements, however, instead thereof essentially any rectangular dimensions and shapes of these elements are applicable, e.g. micro optical elements bonded to arrays of optical fibers as long as the necessary interface areas are defined between these elements.

In a third embodiment shown in FIG. 5 said photonic device is a transmitter and said first section 34 comprises a light source 35 and said second section 36 comprises a splitter 37 for splitting a propagation path 38 of photons emitted by light source 35 into a plurality of propagation paths 39, 40, 41.

In a most preferred embodiment light source 35 is a laser diode light source or a hybrid optoelectronic chip on which integrated optical elements as a laser source and electronic amplifieres are arranged which chip is bonded at a low temperature bonding area 42 to splitter 37.

For additional amplification of photons generated in light source 35 splitter 37 comprises a material adapted to amplify light from laser diode light source which material is in a preferred embodiment an active phosphate laser glass.

As shown in FIG. 5 a distributed Bragg reflector 43 is connected to every branch 39, 40, 41 of the splitter 37 and thus is apt to define an external cavity for laser diode light source 35. Distributed Bragg reflector 43 has a different pitch for every branch 39, 40, 41 of the splitter 37 defining different resonant cavities for laser diode light source 35 in every branch 39, 40, 41 and, thus different wavelenghts $\lambda_1$, $\lambda_2$, $\lambda_3$ in different branches.

In the preferred embodiment, distributed Bragg reflector 43 consists of a passive glass substrate.

As shown in the central part of FIG. 5, an electrooptic $LiNbO_3$ modulator 44 is connected to at least one and in this embodiment to every branch 39, 40, 41 of splitter 37 for modulating an optical phase of photons in a respective branch 39, 40, 41. By means of electrical voltages applied to electrode pairs 45, 46, 47 an electrooptic alteration of the index of refraction of the $LiNbO_3$ modulator 44 is introduced modulating a phase of photons propagating through modulator 44.

In an alternate embodiment a polarization of photons propagating through modulator 44, is modulated if linear polarized light is generated by laser diode light source 35 and feed to modulator 44 and only one transversal component of the electric field vector of said linear polarized light is modulated in its optical phase.

A combiner 48 which preferably consists of silica glass is connected to modulator 44 for combining propagation paths 39, 40, 41 and providing a combined propagation path 49.

As shown in the right portion of FIG. 5, an optical amplifier 50 is connected to combined propagation path 49 of combiner 48 for amplifying light propagated through combiner 44.

Optical amplifier 50 essentially consists of an erbium doped glass substrate 51 which is optically pumped by a laser diode light source 52, preferably at a pump light wavelenghts of 980 or 1480 nm.

Amplified light is fed to an optical fiber 53 which is connected to the optical path 49 extending in substrate 51 by means of a low temperature bonding area 54.

The invention, however, in case of a transmitter is not restricted to the above-described embodiment. In more general terms light source 35 could be a light emitting diode or a diode array as well as a laser diode array feeding a plurality of splitters. Significantly, vertical cavity surface emitting lasers (VCSELs) or arrays of vertical cavity surface emitting lasers (VCSELs) are preferred light sources as the emission characteristics of emitted photons are well adapted for a connection to external waveguides. However, also glass based laser sources are applicable.

In addition, instead of a highly sophisticated design as seen from the above described third embodiment said second section comprises in a simplified embodiment only structures defining a propagation path for the emitted photons as e.g. wave guides, optical fibers or beam splitters.

Bragg reflectors, distributed Bragg reflectors, tunable Bragg reflectors and wavelength dependent absorbers are applicable to adapt or correct a spectral gain of light source 35 for specific purposes.

Reference is made to FIG. 6 depicting a fourth embodiment of a photonic device being an ultra broadband amplifier. Optical signals are fed to the ultra broadband amplifier through an optical fiber 55 which fiber is connected—for example by the low temperature bonding technique—to a wavelength depended splitter splitting optical propagation paths into three paths, a first path 56 for a wavelength band which is centered at about 1.3 µm, to a second propagation path 57 where the optical wavelength band is centered at about 1.4 µm and to a third propagation path having a wavelength band centered at about 1.5 µm.

Wavelength dependent splitter 59 is connected to an optical amplifier assembly comprising three individually independent optical amplifiers 60, 61, 62.

Amplifiers 60, 61, 62 are connected to wavelength dependent splitter 59 means of an low temperature bonding area 63. Propagation paths extending through wavelength dependent splitter 59 which preferably is a wavelength division multiplexer arrayed waveguide grating structure (WDM-AWG) are extending through optical amplifiers 60, 61 and 62 and are combined in optical combiner 64 into a combined propagation path 65 which is connected to an external fiber 66.

Optical combiner 64 preferably is a waveguide structure incorporated in a silicate glass body 67.

If a photon enters wavelength dependent splitter 59 then it propagates along a propagation path associated with its wavelength and the photon is guided to and through an optical amplifier 60, 61, 62 associated with its respective wavelength. Different materials in optical amplifiers 60, 61 are associated with respective different wavelengths of the optical signals.

Amplifier 60 is comprising Praseodym doped chalcogenide glass and shows excellent amplification characteristics in a wavelength band centered around 1.3 µm if this glass is optically pumped by means of a light source 68 emitting a pump light wavelength of about 1020 nm.

Optical amplifier 61 is associated with a wavelength band centered around 1.4 µm and comprises Tm doped fluoride glass which is optically pumped by light source 69 emitting a pump light wavelength of about 800 nm.

Optical amplifier 62 amplifies light within a wavelength band centered around 1.5 µm and comprises Erbium doped phosphate glass which is optically pumped by pump light source 70 with a pump light wavelength of about 980 nm.

In a most preferred embodiment pump light sources are Laser diode light sources which also are connected to the active optical material of the optical amplifier 60, 61, 62 by means of a low temperature bonding area.

According to this embodiment a significant extension of the spectral gain is obtained and essentially all relevant optical bands as use in optical transmission and optical information processing are covered by the invention.

In addition, this embodiment is not respected to only three optical amplifiers as persons skilled in the art will know how to add a plurality of further amplifiers in parallel by using an arrayed waveguide grating providing a plurality of different wavelength bands and by using an optical combiner to combine a plurality of optical propagation paths extending through a plurality of optical amplifiers.

In a fifth embodiment of a photonic device which is shown in more detail in FIG. 7 a further optical amplifier is depicted having an extended spectral gain widths and a flattened spectral gain as shown in FIG. 8.

In FIG. 6 an optical amplification assembly is shown comprising amplifiers being connected in parallel. In the fifth embodiment of the photonic device amplifiers 71, 72 are connected serially by means of a low temperature bonding area 73.

Optical amplifier 71 defines a first section of the photonic device comprising active material as for instance erbium doped silica and optical amplifier 72 is defining a second section of the photonic device and is comprising an active material as e.g. erbium doped lead silicate.

If an optical signal is fed to the hybrid amplifier by means of a fiber 74 which is connected to the hybrid amplifier by means of a low temperature bonding area at the fiber's exit surface light enters first amplifier 71 along a propagation path 76 and is amplified according to a spectral gain widths which is shown in FIG. 8 and depicted as curve (a) for a silica glass ($SiO_2$). Travelling further along propagation path 76 light is further amplified in amplifier 72 according to a spectral gain curve shown in FIG. 8 and as depicted by curve (c) causing an overall gain shown as curve (b) in FIG. 8.

It is obvious that curve (b) exhibits a broader spectral gain which also is flattened, if compared with curves (a) and (c).

For optimized signal processing purposes optical pump light sources 77, 78 are controlled in intensity based on signals as received from photo detectors 79, 90, respectively.

In case of weak optical signals an increased gain is provided based on an increased intensity of pump light sources 77 and 78. Thus, an amplified optical signal exits the hybrid amplifier shown in FIG. 7 along propagation path 76 crossing a low temperature bonding area 81 and entering an optical fiber 82.

Also this embodiment is not restricted to a number of two amplifiers, and a plurality of further amplifiers may be used for different purposes. Moreover, this embodiment is not restricted to a single signal fiber as also a linear fiber array could be connected to an array of hybride amplifiers which in this embodiment then also would be arranged in a row one next to the other. In such an embodiment FIG. 7 would depict only one element of a row of hybride amplifiers.

Significantly, a person skilled in the art also will adopt basic principles of embodiments shown in FIGS. 6 and 7 to assemble optical amplifiers in a combination of parallel and serial arrangements.

Reference is made to FIG. 9 depicting a sixth embodiment of a photonic device being a receiver cascaded with optical amplifiers.

A first section of this photonic device comprises a plurality of photo diodes 83, 84, 85 which are bonded by means of a low temperature bonding area to optical amplifiers 86, 87, 88, respectively.

Light entering the receiver assembly shown in FIG. 9 along optical fiber 89 enters into an arrayed waveguide grating 90 subsequent to crossing a low temperature bonding area 91.

Arrayed waveguide grating 90 is a wave-length dependence splitter splitting optical signals into a plurality of wavelength bands propagating along separated propagation paths 92, 93, 94.

Associated with each propagation path are respective photo diodes 95, 96, 100 detecting the intensity of an optical signal propagating along these paths. According to the intensities detected by photo diodes 94, 95, 96 laser diode pump lasers 97, 98, 99 are pumping optical amplifiers 86, 87, 88, preferably with a pump light wave length of 980 nm in case of erbium doped phosphate glass with a pump light intensity being dependent on the intensity of the optical signals as described in case of the hybrid optical amplifier.

As a consequence of the light amplification process, photo diodes 83, 84, 85 are exhibiting a better performance, especially in terms of an improved signal-to-noise ratio.

Also this embodiment is not restricted to a number of three photo diodes, and a person skilled in the art is aware how to arrange a further plurality of additional photo diodes and optical amplifiers.

Reference is made to FIG. 10 where a seventh embodiment of a photonic device is shown which device is an optical add/drop multiplexer.

In a first section this photonic device comprises a demultiplexer to which optical signals are fed along an optical fiber 102. In general, arrayed waveguide grating 101 spectrally separates signals from optical fiber 102 onto different propagation paths 103, 104, 105, 106 which each are connected to an entrance port of a Mach-Zehnder interferometer element 107, 108, 109, 110, respectively.

Signals to be added are fed to a second entrance port of Mach-Zehnder interferometers 107, 108, 109, 110 along signal paths 111, 112, 113, 114 extending in a two-dimensional optical substrate or propagating at least in part through an array optical fibers.

In more detail a Mach-Zehnder interferometer similar to the interferometers 107, 108, 109, 110 is shown in upper right corner of FIG. 10. This interferometer consists of two passive glass regions 115, 116 and a thermooptical glass region which is bonded to the passive glass regions by the said low-temperature bonding methods and processes. In said thermooptical glass a heatable part of a waveguide of at least one branch 118, 119 of said Mach-Zehnder interferometer introduces an optical propagation delay which causes a destructive or a constructive interference of signals transmitted through the Mach-Zehnder interferometer at exits 120, 121.

In an alternate embodiment a propagation delay is introduced by means of an electrooptic crystal in at least one of the arms of the Mach-Zehnder interferometer which crystal replaces thermooptical glass region 117.

Based on this switching functionality, signals to be dropped are switched from exits of Mach-Zehnder interferometers 107, 108, 109, 110 to propagation paths 122, 123, 124, 125.

Said signals to be dropped are amplified in an amplification unit 126 similar to the amplification assembly of ultra-broadband amplifier of FIG. 6 comprising optical amplifiers 60, 61, and 62 or similar to optical amplifiers 86, 87, 88 of the receiver shown in FIG. 9.

Optical signals exiting a respective second exit of Mach-Zehnder interferometers 107, 108, 109, 110 along propagation paths 126, 127, 128, 129 are combined by a combiner 130 and fed into an optical amplifier 131.

Combiner 130 is an arrayed waveguide grating in a preferred embodiment or a combiner as shown in FIG. 6 as silicate glass combiner 64 of the described ultra broadband amplifier.

Optical amplifier 131 is connected to an optical fiber 132 to which the amplified and multiplexed optical signals are fed.

An optical multiplexer as shown in FIG. 10 switches between two signal propagation paths 103, 104, 105, 106, and 111, 112, 113, 114, respectively, however switching between more than two signal paths is achieved, if a plurality of Mach-Zehnder interferometers is connected serially as is readily understood by a person skilled in the art.

In addition, the invention is not restricted to a number of four Mach-Zehnder interferometers connected in parallel as a huge plurality of parallel and serially Mach-Zehnder interferometers could be provided on integrated optical substrates being designed in its connectivity to serve a huge variety of different switching application needs.

Moreover, this embodiment is also not restricted to a single input fiber 102 as the arrangement depicted in FIG. 10 could be an element of a row of optical add/drop multiplexers which are fed by a linear array of optical fibers 1 to n ech fiber of which feeds an onw optical add/drop multiplexer and optical output fiber could be an element of a linear output fiber array in which remaining elements of the optical output fiber array are connected to the outputs of other optical add/drop multiplexers.

Reference is made to a further preferred embodiment of a photonic device as depicted in FIG. 11 where an arrayed waveguide grating is schematically shown.

If an optical signal is fed to this arrayed waveguide grating along an optical fiber 133 which is connected to a first coupler 134, then a plurality of different wavelengths bands centered at λ1, λ2, λ3, λ4 is propagated along a plurality of waveguides all of which schematically are designated by numeral 135. These waveguides 135 are part of an optical substrate defining a first section of this photonic device and with a first index of refraction $n_1$ having a positive temperature coefficient $\partial n_1/\partial T$.

In a second section of the arrayed waveguide grating a second plurality of waveguides 136 extends in a material having an index of refraction $n_2$ and a negative temperature coefficient $\partial n_2/\partial T$. In a third section of arrayed waveguide grating a third plurality of waveguides 137 is defined in a material having a positive temperature coefficient $\partial n_3/\partial T$ and an index of refraction $n_3$. In a preferred embodiment materials of the first section embedding waveguides 135 and the third section comprising waveguides 137 are identical.

Different temperature coefficients $\partial n/\partial T$ are shown in FIGS. 12a, 13a, and 13b for different materials and as a function of the temperature. FIG. 12b shows typical wavelength dependencies of different temperature coefficients $\partial n/\partial T$ for different materials.

It readily is seen from FIG. 12a that a combination of glasses as f.i. N-PK52 or N-FK51 with glasses SF6, H-LASF40, F2, N-LAKB or N-BK7 exhibit a compensating effect in that an overall change of the index of refraction encountered by a photon which propagates through such a material having a positive and then through such a material having a negative temperature coefficient is decreased, if compared to a refractive index change of a material having solely a positive or solely a negative temperature coefficient.

In a most preferred embodiment a length of waveguides 135, 136 and 137 is chosen to provide a complete temperature compensation, i.e. an overall temperature coefficient which essentially is zero for a predefined temperature or temperature range.

As a consequence of the temperature compensating effect, optical output signals as fed from coupler 138 to optical output fibers 139, 140, 141, 142 are thermally extremely stable.

Due to the high-quality bond interfaces 143 and 144 defining low temperature bonding areas no deleterious effects are superimposed on output signals separated and centered at wavelength bands at λ1, λ2, λ3, λ4.

According to the invention, this temperature-compensating functionality is not restricted to arrayed waveguide gratings, but might be introduced into any optical or photonic devices having waveguides that might be divided into two groups where one group comprises waveguides with a positive temperature coefficient and the other group comprises waveguides with a negative temperature coefficient.

Significantly, not all low temperature bonding were discussed in detail in the present description, however, a further indication is given in the drawings at interface areas between two elements. At these locations a bold portion of the drawing indicates an additional low temperature bonding area, even if not mentioned in more detail in the description.

What is claimed is:

1. A photonic device comprising:
a first section including an optical material,
a second section including an optical material, with an area of said first section and an area of said second section abutting each other,
wherein at least a part of said first area and a part of said second area define a low temperature bonding area, said first section and said second section being joined together by an interlayer which comprises a cured phosphorous-containing solution and wherein said first section and said second section form a waveguide.

2. A photonic device according to claim 1, wherein said low temperature bonding area connects said first area and said second area mechanically and optically.

3. A photonic device according to claim 2, wherein said low temperature bonding area comprises a surface area of said first section and a surface area of said second section which are connected by means of a low temperature bonding method.

4. A photonic device according to claim 1, wherein said optical material is useable for transmission of photons, reflection of photons, absorption of photons, generation of photons, emission of photons, wavelength conversion of photons, guiding of photons, diffraction of photons, refraction of photons, superimposing photons, generation of photon interference and linear, elliptic or circular polarization of photons.

5. A photonic device according to claim 1, wherein said second section is a surface area between a first section and a third section.

6. A photonic device according to claim 1 wherein said first section comprises a block of glass with a waveguide and said second section comprises an optical fiber.

7. A photonic device according to claim 1, wherein said first material has at least a portion where an index of refraction is different from an index of refraction of at least a portion of said second material.

8. A photonic device according to claim 7, wherein said photonic device is a wave guide defined in a surface area of said first material and said waveguide is covered by said second material.

9. A photonic device according to claim 8, wherein an essentially two-dimensional optical chip is defined with waveguides connecting active and passive optical components.

10. A photonic device according to claim 7, wherein said waveguide is defined in a bulk area of the first material.

11. A photonic device according to claim 10, wherein said waveguide extends oblique to a surface of said first material.

12. A photonic device according to claim 10, wherein said waveguide in said first material is connected to a waveguide extending in said second material.

13. A photonic device according to claim 10 wherein, an essentially three-dimensional optical chip is defined with waveguides connecting active and passive optical components.

14. A photonic device according to claim 13, wherein said first section comprises a waveguide extending in a bulk material and said second section comprises an optical fiber.

15. A photonic device according to claim 1, wherein said photonic device is a transmitter and said first section comprises a light source and said second section comprises a splitter for splitting a propagation path of photons emitted by the light source into a plurality of propagation paths.

16. A photonic device according to claim 15, wherein splitter comprises a light amplifying material amplifying light from said light source.

17. A photonic device according to claim 16, wherein said material is an active phosphate laser glass.

18. A photonic device according to claim 15, wherein a distributed Bragg reflector is connected at least to one branch of the splitter.

19. A photonic device according to claim 15, wherein a modulator is connected to at least one branch of the splitter for modulating one element of the group consisting of a phase of photons, an intensity of photons and a polarization of photons, said photons being propagating through said modulator.

20. A photonic device according to claim 19, wherein a combiner is connected to the modulator for combining propagation paths of photons and providing a combined propagation path for the A photons.

21. A photonic device according to claim 20, wherein an optical amplifier is connected to the combiner for amplifying light which propagated through the combiner.

22. A photonic device according to claim 1, wherein said photonic device is a transmitter and said first section comprises a light source, said light source being an element of the group consisting of light emitting diodes, laser diodes, diode arrays, laser diode arrays, vertical cavity surface emitting lasers (VCSELs), arrays of vertical cavity surface emitting lasers (VCSELs) and glass based laser sources, and
said second section comprises an element of the group consisting of wave guides, optical fibers, beam splitters, Bragg reflectors, distributed Bragg reflectors, tunable Bragg reflectors, light modulators and wavelength dependent absorbers.

23. A photonic device according to claim 1, wherein said photonic device is an amplifier and said first section comprises a wavelength dependent splitter splitting different wavelength bands into different propagation paths and said second section comprises an amplifying material at least for one of the wavelength bands associated with one of the propagation paths of the wavelength dependent splitter.

24. A photonic device according to claim 23, wherein said wavelength dependent splitter splits light into a plurality of different wavelength bands each of the different wavelength bands associated with a different propagation path and said second section comprises a plurality of portions comprising an amplifying material associated with at least one of the wavelength bands associated.

25. A photonic device according to claim 24, wherein each of the portions comprising amplifying material contains a dopant being a rare earth element adapted in its amplifying characteristics to said associated wavelength band for amplifying light of the said associated wavelength band.

26. A photonic device according to claim 25, wherein each of the portions comprising amplifying material is optically pumped by a diode laser light source adapted to an absorption characteristic of said portion comprising amplifying material.

27. A photonic device according to claim 26, wherein said splitter is an arrayed waveguide grating and splits light into transmission bands essentially centered at 1.3 $\mu$m, 1.4 $\mu$m and 1.5 $\mu$m, said 1.3 $\mu$m transmission band being associated with a Praseodym doped Chalcogenide glass and said associated diode laser light source having a pump light wavelength centered at about 1020 nm, said 1.4 $\mu$m transmission band being associated with a Tm doped Fluoride glass and said associated diode laser light source having a pump light wavelength centered at about 800 nm and said 1.5 $\mu$m transmission band being associated with an Erbium doped Phosphate glass and said associated diode laser light source having a pump light wavelengths centered at about 980 nm.

28. A photonic device according to claim 23, wherein a combiner combines propagation paths extending through said plurality of portions comprising amplifying material and is connected to a waveguide for transmitting amplified light.

29. A photonic device according to one of claim 1, wherein said photonic device is an amplifier having a plurality of amplification portions comprising amplifying material and arranged serially in a direction of the propagation of light and wherein said first section comprises a first amplification portion and said second section comprises a second amplification portion.

30. A photonic device according to claim 29, wherein each of the amplifying materials is containing a dopant being a rare earth element adapted in its amplifying characteristics to an associated wavelength band for amplifying light of said associated wavelength band.

31. A photonic device according to claim 30, wherein each of the portions comprising amplifying material is optically pumped by a diode laser light source adapted to an absorption characteristic of said amplifying material.

32. A photonic device according to claim 29, wherein said plurality of amplification portions define and overall gain which has an increased gain over an extended wavelength interval in comparison to one of the said amplification portions.

33. A photonic device according to claim 1, wherein said photonic device is a receiver and said first section comprises a photo detector and said second section comprises at least a waveguide for guiding photons to the photo detector.

34. A photonic device according to claim 33, wherein said photo detector is a photo diode.

35. A photonic device according to claim 33, wherein said second section comprises an light amplifying material for amplification of photons propagating in said waveguide.

36. A photonic device according to claim 35, wherein said amplifying material comprises a rare earth dopant which is optically pumped by a light source.

37. A photonic device according to claim 36, wherein said optical pump light source is a laser diode pump laser.

38. A photonic device according to claim 37, wherein a waveguide section is connected with said amplifying material and wherein a photo diode is connected to a waveguide of said waveguide section for controlling a pump light intensity of a laser diode pump light source associated with said amplifying material.

39. A photonic device according to claim 1, wherein
said photonic device is an optical add drop multiplexer and
said first section comprises a demultiplexer for demultiplexing light into a plurality of propagation paths and said second section comprises optical switching means for switching between light from the multiplexer and added light, said second section is connected to a multiplexer section for multiplexing light from a plurality of propagation paths to a single propagation path.

40. A photonic device according to claim 39, wherein said photonic device is an optical add drop multiplexer and said second section comprises a plurality of entrance ports for light to be added and a plurality of exit ports for light to be dropped, said light to be dropped being switched by said optical switching means to the exit ports.

41. A photonic device according to claim 39, wherein said switching means comprise Mach Zehnder type interferometers for essentially absorption free switching of the propagation direction of photons based on an alteration of the optical path length in at least one of the arms of the Mach Zehnder interferometer.

42. A photonic device according to claim 41, wherein said alteration of the optical path length of said at least one arm of the Mach Zehnder interferometer is introduced thermooptically.

43. A photonic device according to claim 41, wherein said alteration of the optical path length of said at least one arm of the Mach Zehnder interferometer is introduced electrooptically.

44. A photonic device according to claim 41, wherein said dropped light is amplified by an optical amplifier and said demultiplexed light is amplified by an optical amplifier.

45. A photonic device according to claim 1, wherein said photonic device has at least a first waveguide in said first section comprising a material having an index of refraction $n_1$ with a positive temperature coefficient $\partial n_1/\partial T$ and with at least second waveguide in said second section comprising a material having an index of refraction $n_2$ with a negative temperature coefficient $\partial n_2/\partial T$ said first and said second waveguides being optically connected to each other.

46. A photonic device according to claim 45, wherein an overall temperature coefficient of an effective index of refraction encountered by a photon propagating through the first and second waveguide is essentially temperature independent.

47. A photonic device according to claim 45, having a third section comprising a material having an index of refraction n3 with a positive temperature coefficient $\partial n/\partial T$ with a third waveguide in said third section optically connected to said second waveguide.

48. A photonic device according to claim 47, wherein an overall temperature coefficient of an effective index of refraction encountered by a photon propagating through the first, second and third waveguide is essentially temperature independent.

49. A photonic device according to claim 45, wherein said photonic device is a mutliplexer/demultiplexer comprising a plurality of first waveguides, a plurality of second waveguides and a plurality of third waveguides.

50. A photonic device according to claim 1, wherein at least one material adapted to interact with photons is not a phosphate glass.

51. A photonic device comprising:

a first section including an optical material, a second section including an optical material, with an area of said first section and an area of said second section abutting each other and at least a part of said first area and a part of said second area defining a low temperature bonding area comprising a condensed phosphate layer, wherein said photonic device defines a three-dimensional waveguide structure comprising first and second portions extending perpendicular to each other.

52. The photonic device according to claim 51, defined by a plurality of optical elements which are provided in a three-dimensional arrangement.

53. The photonic device according to claim 52, wherein at least some of said optical elements are cubes.

54. The photonic device according to claim 51, comprising optical waveguides extending in three dimensions providing waveguiding in three dimensions.

55. A photonic device comprising:

a first section including an optical material, a second section including an optical material, with an area of said first section and an area of said second section abutting each other, wherein at least a part of said first area and a part of said second area define a low temperature bonding area comprising a cured phosphorous-containing solution.

56. A photonic device comprising:

a first section including an optical material, a second section including an optical material, with an area of said first section and an area of said second section abutting each other, wherein at least a part of said first area and a part of said second area define a low temperature bonding area comprising a condensed phosphate layer.

57. A photonic device according to claim 56, wherein the condensed phosphate layer is a P—O—P layer.

58. A photonic device comprising:

a first section including an optical material, a second section including an optical material, with an area of said first section and an area of said second section abutting each other and wherein at least a part of said first area and a part of said second area define a low temperature bonding area and wherein said low temperature bonding area comprises a cured phosphorous-containing solution.

* * * * *